UNITED STATES PATENT OFFICE.

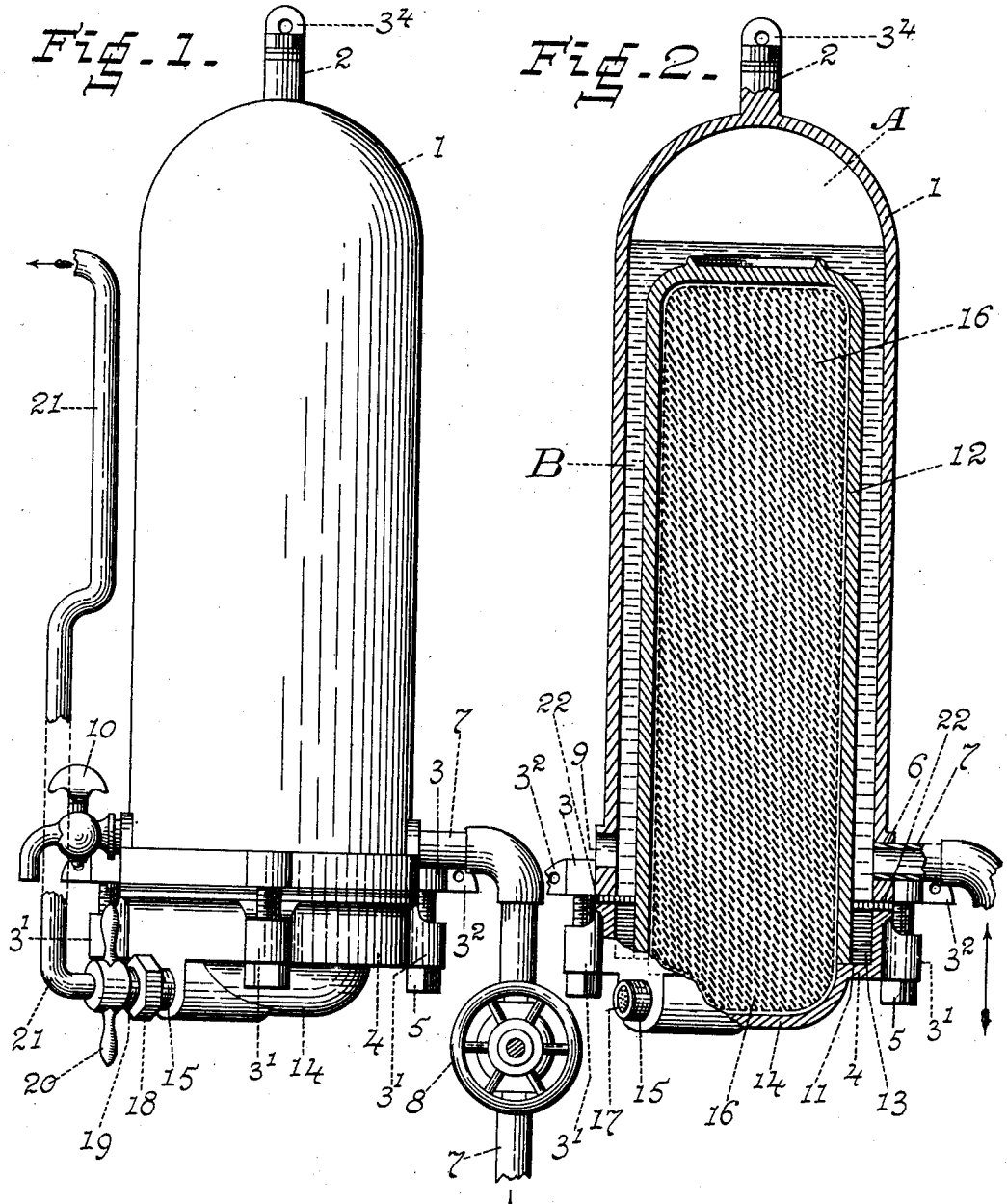

RALPH ELWIN CADY, OF AUBURN, NEW YORK, ASSIGNOR OF ONE-HALF TO FRANK E. CADY, OF AUBURN, NEW YORK.

WATER-FILTER.

No. 829,503.  Specification of Letters Patent.  Patented Aug. 28, 1906.

Application filed November 18, 1905. Serial No. 288,030.

*To all whom it may concern:*

Be it known that I, RALPH ELWIN CADY, a citizen of the United States, residing at the city of Auburn, in the county of Cayuga and State of New York, have invented new and useful Improvements in Water-Filters, of which the following is a specification.

My improvement relates to water-filters in which water under pressure is admitted to a cylinder and forced through a porous receptacle charged with filtering material to abstract or separate therefrom such impurities and harmful matter as may be held in suspension therein, the purified water being passed to a suitable tank or cooler, whence it is drawn for use. Heretofore much trouble and expense has ensued through the fracturing of the porous filtering-receptacles carried in the outer cylinders consequent on the jar or pounding caused by the opening and shutting off of the taps of adjacent closets, sinks, &c.; and the object of my improvement is to provide means for conserving the integrity of the said porous receptacles, thus enabling the same to be continuously used and the trouble and expense consequent on the renewal of the same averted.

The above object is attained by the mechanism and arrangement of the several parts of a water-filter shown in the accompanying drawings, in which—

Figure 1 is a side elevation of a water-filter, and Fig. 2 is a vertical mid-section of the same.

In both drawings similar reference characters refer to similar parts.

Referring to Figs. 1 and 2, an exterior cylinder 1 is provided, having a closed dome-shaped top end provided with a stem 2, which carries a strap or brace 3⁴ for aiding in the support of the water-filter in desired position against the wall. The bottom end of the exterior cylinder 1 is open, as shown in Fig. 2, its outer side being furnished with suitable lugs 3, to which is fastened a bottom piece 4, also provided with lugs 3', by means of the bolts 5. The bottom or open end of said exterior cylinder 1 is further provided at the side with an inlet 6, in which is fitted the water-pipe 7, having a valve 8 for admitting and regulating the flow of water from the source of supply to which said water-pipe is suitably connected. The bottom end of said exterior cylinder 1 is also provided at the side thereof with an outlet or discharge 9, provided with a cock 10, (see Fig. 1,) the office of which will presently be explained. The bottom piece, already referred to, at 4 is also provided with an annular seat or groove 11, on which rests the bottom open end of the porous filtering-receptacle 12, where the latter is properly secured by a suitable waterproof cement, as seen in section at 13 in Fig. 2. The said bottom piece 4 is extended downward sufficiently, as seen at 14, to afford space for an outlet having a threaded end 15, as shown in Fig. 2. Through this said outlet 15 after the porous filtering-receptacle 12 has been cemented on said bottom piece 4 is introduced a filtering material 16, which entirely fills said porous filtering-receptacle 12 and also the bottom piece 4 and its downward extension 14, as clearly seen in Fig. 2. After the porous filtering-receptacle, the bottom piece, and its downward extension have thus been filled with the filtering material the latter is kept from flowing through the outlet 15 by a perforated disk or piece of wire-cloth 17, which is properly placed over the outer end of said outlet 15 and there securely held by a nut 18, having an open threaded boss 19, on which is fastened by a coupling 20 the outlet-pipe 21, which serves to conduct the filtered water to a proper receptacle, cooler, or storage-tank for use. This latter it has not been thought essential to show, as it may be of any pattern or material best fitted for its purpose. The said filtering material 16 may be composed of any desired substance or admixture of substances, like properly-prepared charcoal or ingredients best calculated to separate the impurities from contaminated water.

The bottom piece 4 and the porous filtering-receptacle 12 having been properly charged with filtering material, as has been described, the latter is passed up in the bottom open end of the exterior cylinder 1 and the bottom piece 4 fastened to the bottom end of said exterior cylinder 1 by the bolts 5, an annular packing 22 being placed between the parts, so as to prevent leakage.

Referring to Fig. 2, it will be seen the porous filtering-receptacle is made of such dimension relative to the inner area of the outer cylinder 1 as to afford a water-space B between the outer surface of the former and the inner sides of the latter, while the closed top end of said outer cylinder is extended sufficiently to afford an air space or chamber A above the water surrounding the said porous filtering-receptacle 12, in which arrangement rests the principal feature of my improvement for protecting the said porous filtering-receptacle from fracture or other injury from the pounding consequent on the opening and sudden shutting of the taps of adjacent sinks and closets connected with the same water system, the air in the said air space or chamber A serving as a yielding cushion to receive and dissipate the shock of the blow from said pounding instead of on the sides of the porous filtering-receptacle, as heretofore, which latter were frequently fractured thereby, causing their frequent removal and renewal.

The outlet 9, already mentioned, near the bottom or open end of the outer cylinder 1, having the thumb-cock 10, is for the following purpose: When it is found necessary to remove the bottom end 4 and its attached porous filtering-receptacle 12 for the purpose of cleansing the latter of accumulated impurities or to remove and renew the charging of the filtering material, the water being under pressure is first shut off from the inlet supply-pipe and the outlet-pipe detached, if this latter is thought necessary. The water remaining in the water-space of the outer cylinder is then readily drawn off through the said outlet 9, after which said bottom piece and its attached filtering-receptacle can be removed from the outer cylinder in a cleanly manner.

It will be seen that other and equally effective means for fastening the bottom piece over the bottom open end of the cylinder of the water-filter may be devised; but as the method shown has proved practical in its functions it only remains to explain that some of the lugs 3 on the bottom or open end of the outer cylinder may be extended into ears $3^2$, provided with holes, which in conjunction with the strap or angled piece $3^4$, carried on the stem 2 at the top or closed end of said outer cylinder 1, are utilized for fastening it in any desired position at the side of the room or otherwise.

The several parts connected with my improvement having been assembled and connected, the outer cylinder fastened securely in desired place, the inlet-pipe connected with the water-supply suitably attached to the inlet-aperture of the outer cylinder, and the outlet-pipe coupled on the threaded end of the outlet 15, the operation of the filter is as follows: The valve of the water-supply or inlet-pipe opened, the water flows under its normal pressure into the outer cylinder and up and around the outer area of the porous filtering-receptacle, forcing the air contained in the outer cylinder to the upper or dome-shaped end thereof, where it serves as an elastic body or air-chamber A to receive and minimize any blow or blows upon the adjacent water contained in said outer cylinder and against the outer area of said porous filtering-receptacle consequent on the opening and shutting of adjacent taps in closets, sinks, or otherwise, and thus protecting said porous filtering-receptacle from fracture or other injury. The water being under pressure, as stated, is forced through the substance composing the porous filtering-receptacle and through the filtering compound contained therein and in the bottom piece and its extension, as described, where relieved and separated from sedimentary matter, microbes, algæ, and such other impurities as normally may be held in suspension therein it passes on through the perforated disk or wire-cloth into the outlet or delivery pipe, and thence into the storage-tank or cooler, a purified element ready for drinking or otherwise.

It will be evident to such as are skilled in the art that more or less change and modification can be made in the construction and arrangement of the component parts of the improvement without departing from the spirit of the same.

Having thus described the improvement in detail and its utility, what I claim as new, and desire to secure by Letters Patent of the United States, is—

In a water-filter an outer cylinder having a closed top end an open bottom end a water inlet and a discharge-outlet, and a porous filtering-receptacle charged with a filtering compound attached to a bottom piece provided with an extension having a water-outlet, said bottom piece and its extension being also charged with a filtering compound, said porous filtering-receptacle being adapted to pass in said open bottom end of said outer cylinder so a water-space may be afforded between the two and an air space or chamber afforded in the closed top end of said outer cylinder over the top end of said charged porous filtering-receptacle, said charged bottom piece and its said charged extension adapted to be fastened over said open bottom end of said outer cylinder, with means for securing the whole in desired working position and means for conveying the filtered product to a proper receptacle substantially in the manner and for the purpose herein described and shown.

In testimony whereof I affix my signature in presence of two subscribing witnesses.

RALPH ELWIN CADY.

Witnesses:
FRANK R. RATHBUN,
HARRY D. BENHAM.

It is hereby certified that Letters Patent No. 829,503, granted August 28, 1906, upon the application of Ralph Elwin Cady, of Auburn, New York, for an improvement in "Water-Filters," was erroneously issued to said "Ralph Elwin Cady and Frank E. Cady," as joint owners of said invention; whereas the patent should have been granted to *Frank E. Cady*, he being sole owner of the entire interest as shown by the assignments of record in the Patent Office; and that the said Letters Patent should be read with this correction therein that the same may conform to the record of the case in the Patent Office.

Signed and sealed this 30th day of October, A. D., 1906.

[SEAL.]

F. I. ALLEN,
*Commissioner of Patents.*